US012767119B2

(12) United States Patent
Hewerdine

(10) Patent No.: US 12,767,119 B2
(45) Date of Patent: Oct. 20, 2026

(54) CONTROL SYSTEM FOR A HYBRID VEHICLE WITH MULTIPLE MODES FOR DIVERTING FLYWHEEL ENERGY

(71) Applicant: Caterpillar Inc., Peoria, IL (US)

(72) Inventor: Kyle P. Hewerdine, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 103 days.

(21) Appl. No.: 18/783,966

(22) Filed: Jul. 25, 2024

(65) Prior Publication Data

US 2026/0028014 A1 Jan. 29, 2026

(51) Int. Cl.
*B60W 20/20* (2016.01)
*B60W 20/13* (2016.01)

(52) U.S. Cl.
CPC ............ *B60W 20/20* (2013.01); *B60W 20/13* (2016.01); *B60W 2510/1005* (2013.01); *B60W 2510/244* (2013.01)

(58) Field of Classification Search
CPC ................. B60W 20/20; B60W 20/13; B60W 2510/1005; B60W 2510/244
See application file for complete search history.

(56) References Cited

U.S. PATENT DOCUMENTS 5,789,882 A 8/1998 Ibaraki et al.
5,841,201 A * 11/1998 Tabata ................. B60W 10/08 290/40 C
6,387,004 B1 * 5/2002 Parrish ................... B60K 6/445 903/910
7,694,762 B2 4/2010 Supina et al.
7,865,288 B2 * 1/2011 Fukushima ............. F16H 59/02 477/107
8,918,239 B2 * 12/2014 Kim ....................... B62D 61/02 180/65.265

(Continued)

FOREIGN PATENT DOCUMENTS

DE 102012017239 A1 2/2013
IN 202041010651 A 3/2020

OTHER PUBLICATIONS

Written Opinion and International Search Report for Int'l. Patent Appln. No. PCT/US2025/037514, mailed Oct. 9, 2025 (13 pgs).

*Primary Examiner* — Sze-Hon Kong
(74) *Attorney, Agent, or Firm* — Bookoff McAndrews PLLC

(57) ABSTRACT

A user may select a first drive mode or a second drive mode for a hybrid vehicle having the hybrid powertrain from a user interface. The hybrid powertrain may include: a motor-generator unit, a battery electrically connected to the motor-generator unit, an engine, a flywheel engageably connected to the engine and the motor-generator unit; and a transmission engageably connected to the flywheel and the motor-generator unit. The selected drive mode may be sent to a controller connected to the hybrid powertrain. The controller may divert energy from the flywheel based on the state of charge of the battery and the selection of either the first drive mode or the second drive mode. In the first drive mode, the controller diverts energy from the flywheel to the transmission, and in the second drive mode, the controller diverts energy from the flywheel to the motor-generator unit to charge the battery.

20 Claims, 4 Drawing Sheets

(56) References Cited

U.S. PATENT DOCUMENTS

| | | | | |
|---|---|---|---|---|
| 11,421,585 | B2 | 8/2022 | Lister et al. | |
| 2007/0275819 | A1* | 11/2007 | Hirata | B60W 20/40 477/98 |
| 2010/0280712 | A1* | 11/2010 | Bowman | B60W 10/02 180/165 |
| 2012/0197472 | A1* | 8/2012 | He | B60K 6/105 475/5 |
| 2013/0157806 | A1* | 6/2013 | Koyama | B60W 30/19 903/902 |
| 2014/0103761 | A1* | 4/2014 | Atkins | H02K 7/1815 310/74 |
| 2014/0228168 | A1* | 8/2014 | Kaufman | B60W 20/13 180/65.265 |
| 2016/0091059 | A1* | 3/2016 | Boulet | F16H 61/0437 475/149 |
| 2016/0137188 | A1* | 5/2016 | Zhu | B60K 6/365 180/65.265 |
| 2016/0200310 | A1* | 7/2016 | Amemiya | B60K 6/547 701/22 |
| 2016/0208911 | A1 | 7/2016 | Cross | |
| 2016/0214610 | A1* | 7/2016 | Kotsuji | B60W 30/18 |
| 2016/0311325 | A1 | 10/2016 | Lieu et al. | |
| 2016/0347167 | A1* | 12/2016 | Dorsett | B60K 6/30 |
| 2017/0151954 | A1* | 6/2017 | Hilton | B60K 35/28 |
| 2018/0236878 | A1* | 8/2018 | Münst | B60L 50/30 |
| 2019/0190346 | A1* | 6/2019 | Jacobson | H02K 7/1815 |
| 2019/0389450 | A1 | 12/2019 | Sujan et al. | |
| 2021/0387528 | A1* | 12/2021 | Thompson | B60L 1/00 |
| 2022/0056839 | A1* | 2/2022 | Rutledge | F02B 33/40 |
| 2023/0106079 | A1* | 4/2023 | Rulfi Fertilio | B60K 6/387 74/661 |
| 2023/0166714 | A1* | 6/2023 | Sullivan | B60W 10/06 701/22 |
| 2023/0332569 | A1* | 10/2023 | Ravichandran | F16D 48/06 |
| 2023/0339451 | A1* | 10/2023 | Yang | B60W 20/20 |
| 2026/0145662 | A1* | 5/2026 | Gesang | B60W 20/12 |

* cited by examiner

CONTROL SYSTEM FOR A HYBRID VEHICLE WITH MULTIPLE MODES FOR DIVERTING FLYWHEEL ENERGY

TECHNICAL FIELD

The present disclosure relates generally to hybrid vehicles, and more particularly, to a control system for a hybrid vehicle.

BACKGROUND

Hybrid vehicles use both engines powered by combustible fuel and motor-generator units powered by batteries to turn gears within a transmission, drive one or more ground engaging elements, and propel the hybrid vehicle. In a parallel hybrid powertrain, the engine may be connected to the motor-generator unit, allowing the hybrid powertrain to convert mechanical power from the engine to electricity for charging the battery via the motor-generator unit. Often, charging of the battery by the engine takes place while the engine is generating excess power. However, during times when the engine power is reduced, such as when changing gears, excess energy stored in a flywheel connected to the engine is allowed to dissipate or is otherwise converted into transmission clutch power or energy.

U.S. Pat. No. 5,789,882, granted on Aug. 8, 1994 ("the '882 patent"), describes a drive control apparatus including an engine output determining device that optimizes the efficiency of the system by determining the output of an engine so as to power a vehicle and also provide surplus power to operate an electric generator and charge an electric energy storage device. An enlarging device may also be included to increase the output of the electric motor to prevent excessive charging of the electric energy storage device. However, the '882 patent does not discuss charging of the battery using excess power stored in the flywheel to charge the battery.

Various aspects of the present disclosure may help to solve one or more of the problems set forth above or other problems in the art. The scope of the current disclosure, however, is defined by the attached claims, and not by the ability to solve any specific problem.

SUMMARY

In one aspect, the disclosure relates to a method of operating a vehicle having a hybrid powertrain. The method may include the step of selecting a first drive mode or a second drive mode for the vehicle having the hybrid powertrain from a user interface, the hybrid powertrain including: a motor-generator unit; a battery electrically connected to the motor-generator unit; an engine; a flywheel engageably connected to the engine and the motor-generator unit; and a transmission engageably connected to the flywheel and the motor-generator unit. The method may further include the steps of sending the selected drive mode to a controller connected to the hybrid powertrain, determining a state of charge of the battery, and diverting energy from the flywheel based on the state of charge of the battery and the selection of either the first drive mode or the second drive mode. When the first drive mode is selected, the controller may divert energy from the flywheel to the transmission, and when the second drive mode is selected, the controller may divert energy from the flywheel to the motor-generator unit to charge the battery when the state of charge of the battery is sufficiently low.

In another aspect, the disclosure relates to a hybrid vehicle. The hybrid vehicle may include a parallel hybrid powertrain including: a motor-generator unit; a battery electrically connected to the motor-generator unit; an engine; a flywheel engageably connected to the engine and the motor-generator unit; and a transmission engageably connected to the flywheel and the motor-generator unit. The hybrid vehicle may further include a controller for controlling the parallel hybrid powertrain. In a first drive mode, the controller may be configured to divert energy from the flywheel to the transmission, and, in a second drive mode, the controller may be configured to divert energy from the flywheel to the motor-generator unit to charge the battery when the state of charge of the battery is sufficiently low.

In yet another aspect, the techniques described herein relate to a control system for a hybrid vehicle. The control system may include, a user interface, one or more pedals, a controller, and a parallel hybrid powertrain including: a motor-generator unit; a battery electrically connected to the motor-generator unit; an engine; a flywheel engageably connected to the engine and the motor-generator unit; and a transmission engageably connected to the flywheel and the motor-generator unit. The controller may be configured to divert energy from the flywheel based on a state of charge of the battery and a selection of either a first drive mode or a second drive mode. When the first drive mode is selected, the controller may divert energy from the flywheel to the transmission, and when the second drive mode is selected, the controller may divert energy from the flywheel to the motor-generator unit to charge the battery when the state of charge of the battery is sufficiently low.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
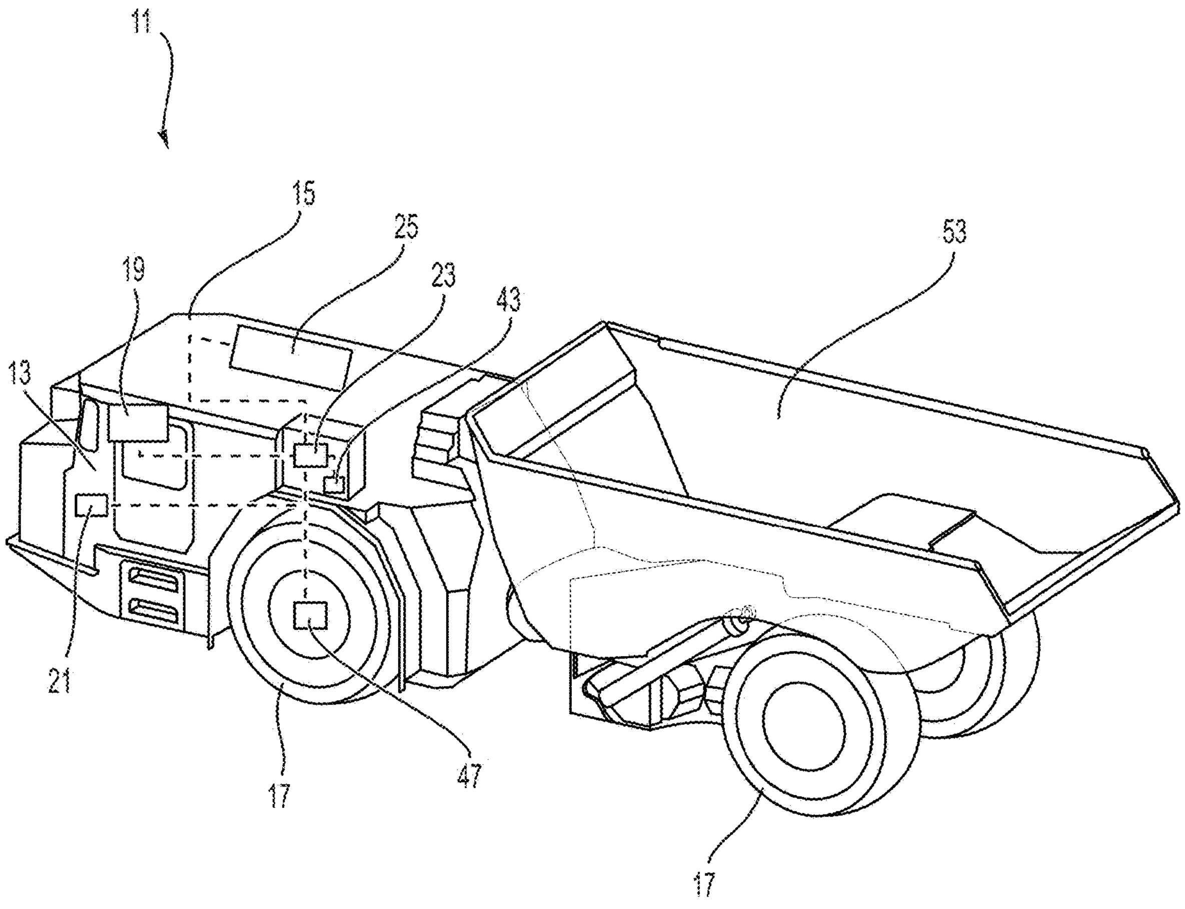
FIG. 1 depicts a hybrid vehicle, according to aspects of the disclosure.

FIG. 1 depicts a hybrid vehicle 11, according to aspects of the disclosure. The hybrid vehicle 11 may include a hybrid powertrain 25, including a motor-generator unit ("MGU")

27, a battery 29, an engine 31, a flywheel 33, a transmission 35 having gears 39, and one or more clutches 38. The hybrid vehicle 11 may be operated in a plurality of operating or drive modes, for example, in either an economy drive mode or a performance drive mode. In the economy drive mode, the energy from the flywheel 33 within the hybrid powertrain 25 of the hybrid vehicle 11 maybe directed to the battery 29 via the MGU 27 and away from the clutches 38 and driveline of the hybrid powertrain 25 during gear shifts. In the performance drive mode, the energy from a flywheel 33 may be absorbed by the clutches 38 and the driveline leaving little energy to divert through the MGU 27 to charge the battery 29.

As shown in FIG. 1, the hybrid vehicle 11 may include a cab 13, a housing 15, and ground engaging elements 17. Within the cab 13, the hybrid vehicle 11 may include a user interface 19 and one or more control elements, for example, pedals 21. The user interface 19 may be a touch screen device, switches, or another appropriate interface(s) for receiving user input. The pedals 21 may include one or more of an accelerator pedal, a brake pedal, or a clutch pedal, depending on the vehicle. Within the housing 15 may be the hybrid powertrain 25, described in more detail below. The hybrid vehicle 11 may further include a controller 23 in electronic communication with the user interface 19, the pedals 21, and the hybrid powertrain 25. The hybrid vehicle 11 may further include an inertial measurement unit ("IMU") 43 and a wheel speed sensor 47, which may both be mounted on or near one or more ground engaging elements 17 of the hybrid vehicle 11. The IMU 43, the wheel speed sensor 47, and other sensors described below may also be in electronic communication (e.g., via one or more wired or wireless connections) with the controller 23.

FIG. 1 depicts the hybrid vehicle 11 as an articulated haul truck, for example, including a bed 53. Additionally, the ground engaging elements 17 are depicted as tires. In other examples, the hybrid vehicle 11 may be another type of large vehicle, such as a heavy duty truck, a bus, a track type vehicle, a mining vehicle, etc. Furthermore, in some examples, the ground engaging elements 17 may be another suitable vehicle propulsion system, such as one or more tracks (e.g., continuous track treads).

Figure 2:
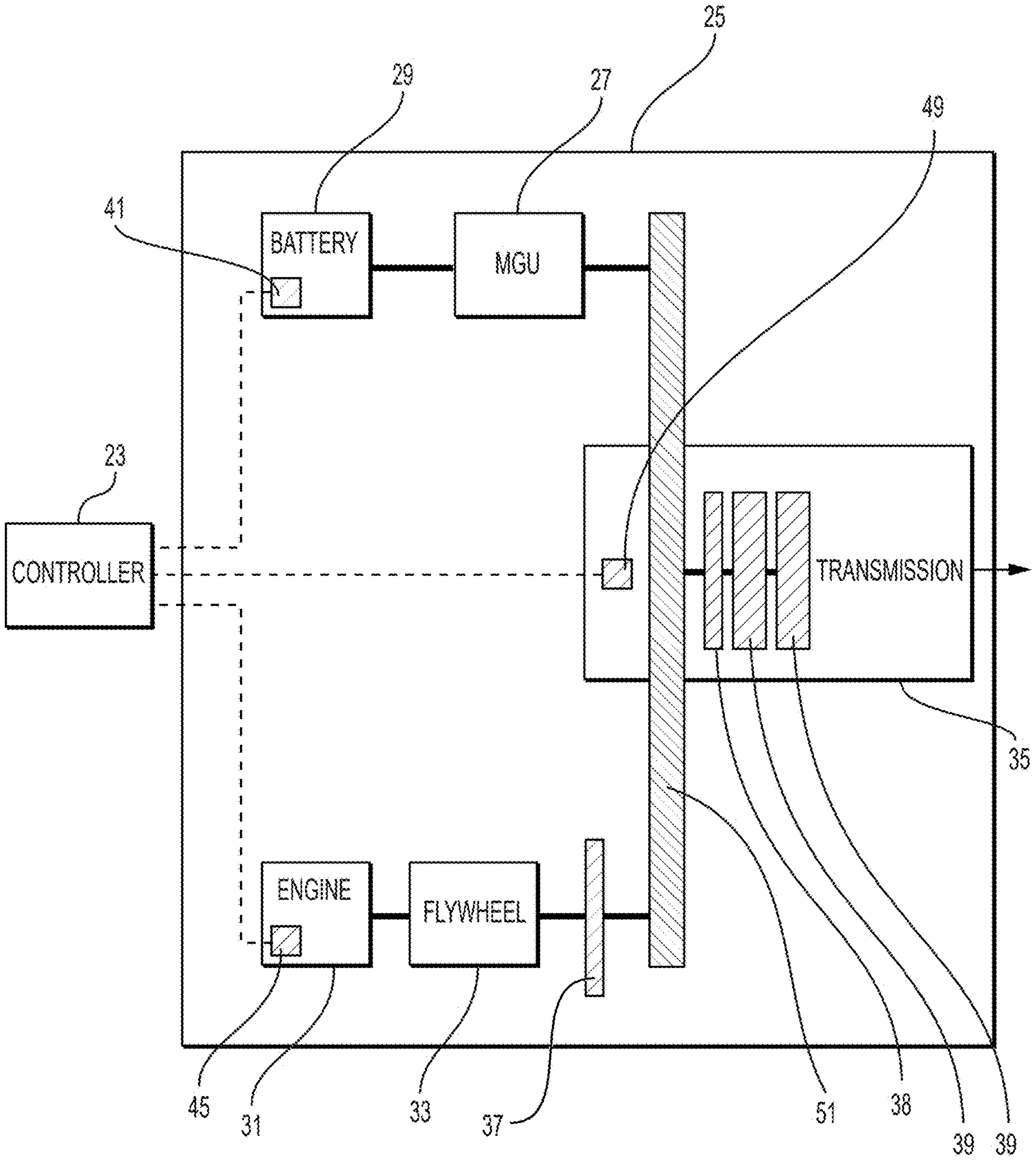
FIG. 2 is a schematic diagram of a powertrain of the hybrid vehicle of FIG. 1.

FIG. 2 is a diagram of the powertrain 25 of the hybrid vehicle of FIG. 1. The battery 29 may be electrically connected to the MGU 27, which may allow power or energy to flow between the battery 29 and the MGU 27, for example, in either direction. The flywheel 33 may be rotatably connected to the engine 31 via a crankshaft (not shown). The flywheel 33 may be engageably and rotatably connected to one or more shaft(s) 51 by a clutch 37. The shaft(s) 51 may extend between the clutch 37 and the MGU 27, and the shaft(s) 51 may connect both the engine 31 and the MGU 27 to the transmission 35.

The transmission 35 may output power received from the MGU 27, the engine 31, or both to the ground engaging elements 17 (FIG. 1) via the driveline of the hybrid powertrain 25. The transmission 35 may include a number of clutches 38 and gears 39. The clutches 38 may interact with the gears 39 so as select and change the gears 39 being driven by the MGU 27 or the engine 31.

The hybrid powertrain 25 may include a number of sensors, which may be in electronic communication (e.g., via wired or wireless connections) with the controller 23. For example, the battery 29 may include a state of charge sensor ("SOC sensor") 41 connected to the controller 23, and the SOC sensor 41 may relay or otherwise transmit signals indicative of a state of charge of the battery 29 to the controller 23. The engine 31 may include an engine speed sensor 45, and the engine speed sensor 45 may relay or otherwise transmit signals indicative of a speed of the engine to the controller 23. Additionally, the transmission 35 may include a transmission sensor 49, for example, within one or more portions of the transmission 35, and the transmission sensor 49 may relay or otherwise transmit signals indicative of a current selected gear 39 of the transmission 35 to the controller 23. In these aspects, the transmission sensor 49 may monitor or calculate the current selected gear 39 of the transmission 35.

During operation of the vehicle, either or both of the engine 31 or the MGU 27 may be used to propel the hybrid vehicle 11. When the engine 31 is used to power the hybrid vehicle 11, the engine 31 may cause the flywheel 33 to rotate, imparting rotational energy to the flywheel 33. The rotation of the flywheel 33 may in turn cause a rotation of the shaft(s) 51. When the MGU 27 is used to power the hybrid vehicle 11, power or energy may flow from the battery to the motor, the motor may cause the shaft(s) 51 to rotate. When the engine 31 is disconnected from the shaft(s) 51 via actuation of the clutch 37, and no power or energy flows from the battery 29 to the MGU 27, the flywheel 33 may impart its stored rotational energy onto the shaft(s) 51. Depending on the drive mode selected (discussed further below) and other factors, the rotational energy from the flywheel 33 may be diverted through the shaft to either the transmission 35 to aid in changing the gears 39 or to the MGU 27 to charge the battery 29. When the flywheel 33 energy is diverted to the MGU 27, the rotation of the shaft(s) 51 may cause the MGU 27 to function as a generator and convert the rotation energy of the shaft(s) 51 to electrical power or energy which may be used to charge the battery 29.

Figure 3:
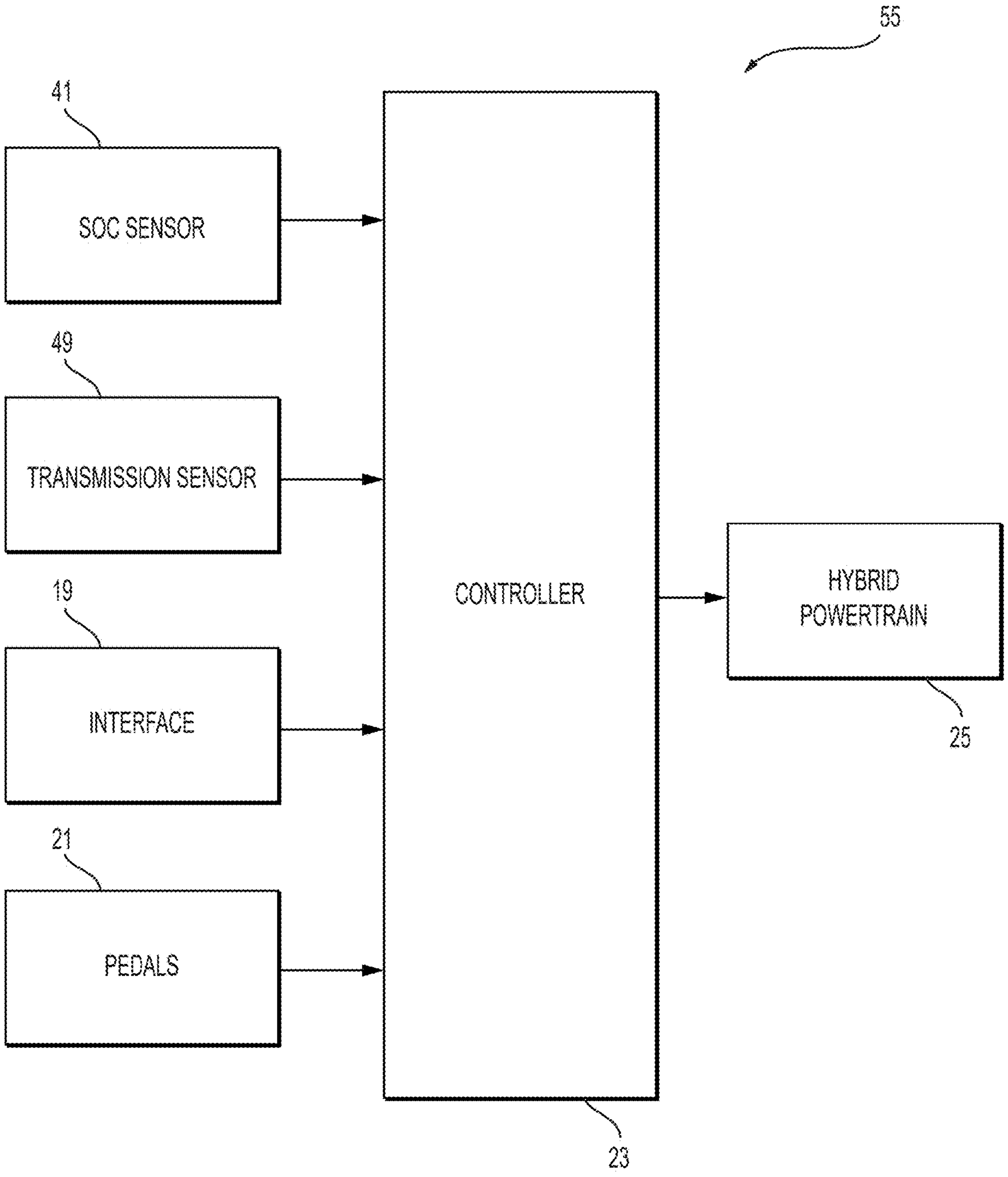
FIG. 3 is a schematic diagram of a control system of the hybrid vehicle of FIG. 1.

FIG. 3 is a diagram of a control system 55 of the hybrid vehicle of FIG. 1. The control system 55 may include the controller 23, the SOC sensor 41, the transmission sensor 49, the user interface 19, the pedals 21, the hybrid powertrain 25, as well as other sensors and components. As shown in FIG. 3, the controller 23 of the control system 55 may receive one or more inputs from one or more of the SOC sensor 41, the transmission sensor 49, the user interface 19, or the pedals 21. The inputs may include the value or other information measured by the sensors, for example, the state of charge of the battery 29 as measured by the SOC sensor 41, and the gear and/or speed of the transmission 35 as measured by the transmission sensor 49. The inputs may also include values input by a user, such as representative values of selections made by a user at the user interface 19, or the value of the amount a user depresses one of the pedals 21. The controller may also send one or more outputs to the transmission 35. The outputs may include, among other things, instructions to the transmission 35 on when to shift gears 39, or where to direct energy from the flywheel 33 (i.e., whether the flywheel 33 should be connected to and provide energy to change the gears 39 within the transmission 35 or charge the battery 29 via the MGU 27).

A user may select a drive mode for the hybrid vehicle 11 using the user interface 19. The drive modes may include, at least, a first or performance drive mode, in which a first or performance shift strategy is used, and a second or economy drive mode, in which a second or economy shift strategy is used. The selection of one of several drive modes by a user may be received by the controller 23. The controller 23 may then use the selection to automatically determine where the flywheel's 33 energy should be directed, for example, based on the selection and/or the state of charge of the battery 29.

In some aspects, in the performance drive mode where the performance shift strategy is utilized, the controller 23 prioritizes changing the gears 39 within the transmission 35 over charging the battery 29. When in the performance drive mode, the controller 23 may divert energy from the flywheel 33 first to the transmission 35 In doing so, the energy from the flywheel 33 may first be used by the clutches 38 to help fill a torque hole (i.e., power loss) created when shifting between gears 39. Any remaining energy not used by the clutches 38 may be diverted to the MGU 27 and used to charge the battery 29 when the state of charge of the battery is sufficiently low.

In some aspects, in the economy drive mode where the economy shift strategy is utilized, the controller 23 prioritizes charging the battery 29 over shifting the gears 39. When in economy mode, the controller 23 may divert a majority of the energy from the flywheel 33 to the MGU 27 to charge the battery 29 when the state of charge of the battery 29 is sufficiently low, and then a minimal amount of energy necessary to shift the gears will be diverted to the transmission 35. In doing so the energy from the flywheel 33 may be used to power or charge the battery 29 via the MGU 27. If the battery 29 reaches sufficient level of charge, at least a portion of any remaining energy from the flywheel 33 may be diverted to the transmission 35 to provide energy for shifting the gears 39. If the shift is completed, any remaining energy may be allowed to naturally decay as the flywheel 33 slows. The resulting gear shift may be less smooth than if the energy from the flywheel 33 had been diverted to the transmission 35, but this operating protocol or drive mode may allow for more energy to be conserved and stored in the battery 29.

Each drive mode may have its own shift schedule for deciding when to shift the gears 39 within the transmission 35. For example, the performance drive mode may have a first or performance drive mode shift schedule, and the economy drive mode may have a second or economy drive mode shift schedule different from the performance drive mode shift schedule. In the economy drive mode, the shift schedule may allow the engine 31 to reach a higher engine speed for a given gear 39 of the hybrid vehicle 11 to increase the amount of electrical energy generated by the MGU 27 to charge the battery 29.

In either drive mode, and particularly in the economy drive mode, the controller 23 may evaluate the state of charge of the battery and the amount of charge to be gained during a potential gear shift to determine whether flywheel 33 energy should be diverted to the MGU 27 to charge the battery 29. For example, that controller 23 may divert energy to the battery 29 when the state of charge of the battery 29 is sufficiently low, for example, when the state of charge of the battery 29 less than or equal to about 80%. In other examples, the controller may divert energy to the battery 29 when the state of charge of the battery 29 is less than or equal about 20%. In further examples, the controller may diver energy is less than or equal to a different value.

INDUSTRIAL APPLICABILITY

The disclosed aspects of the drive mode selection for a hybrid vehicle 11 of the present disclosure may be used to dynamically switch between using excess energy stored in the flywheel 33 to charge the battery or to change gears.

The drive mode selection allows a user to select (e.g., from the user interface 19) whether energy is diverted to the MGU 27 for charging the battery 29, or diverted to the transmission 35 for changing gears from a user input. Diverting energy from the flywheel 33 to the MGU 27 to charge the battery 29 may help to ensure that stored energy is not wasted, which may increase efficiency. Diverting energy from the flywheel 33 first to the transmission 35 may allow for smoother, faster gear shifts with smaller differences in torque between gears.

Figure 4:
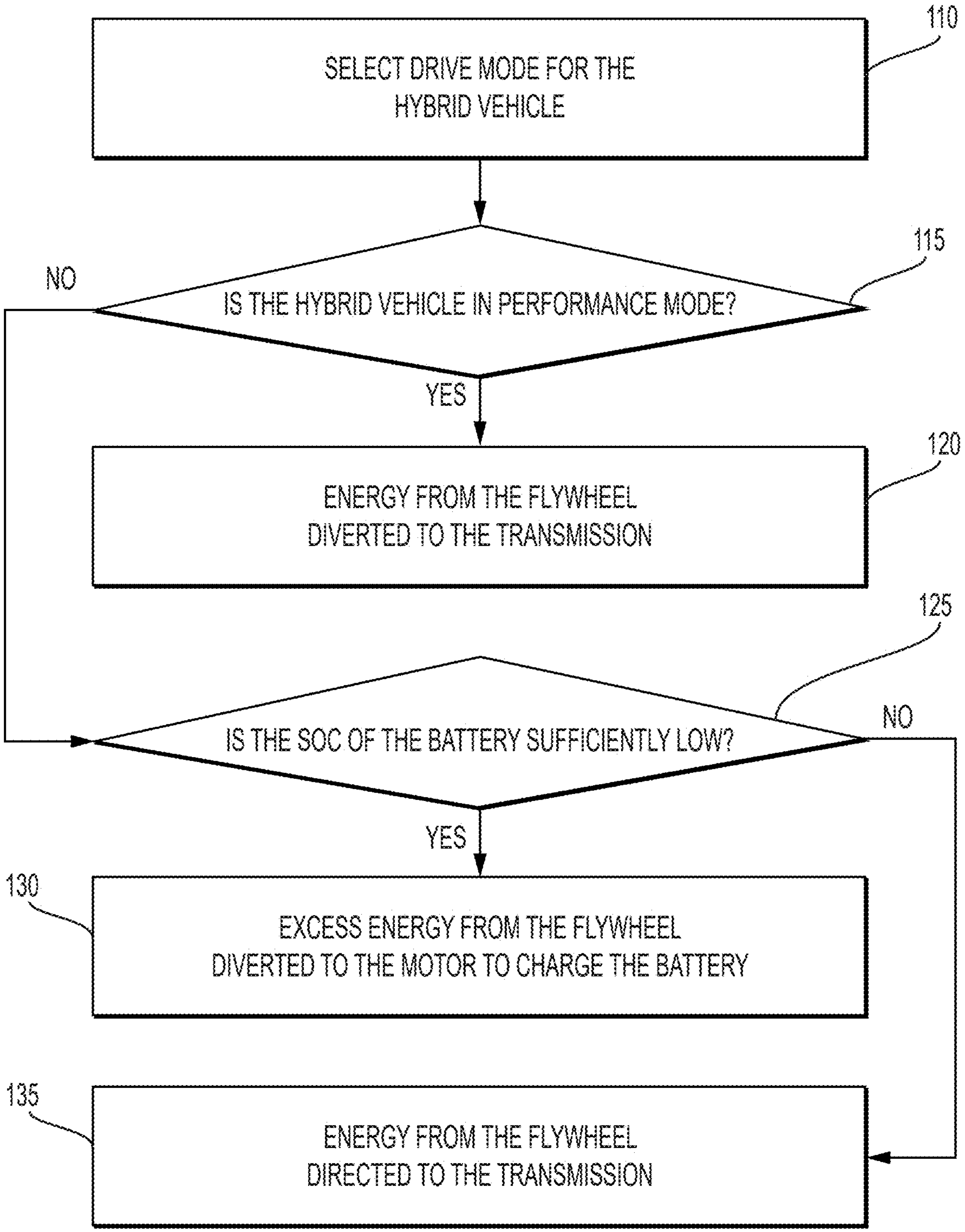
FIG. 4 provides a flowchart depicting an exemplary method for operating a vehicle having a hybrid powertrain.

FIG. 4 provides a flowchart depicting an exemplary method for operating a vehicle having a hybrid powertrain. At a step 110, a drive mode for the hybrid vehicle 11 is selected. In one example, the user may select a drive mode for the hybrid vehicle 11 using the user interface 19. For example, the user may select either the performance drive mode or the economy drive mode from the user interface 19. In another example, the controller 23 may automatically select the drive mode for the hybrid vehicle using logic programmed into the memory of the controller. In a further example, the controller may select the drive mode for the hybrid vehicle 11 using inputs from a user and logic programed into the memory of the controller 23. The selected drive mode may be sent to the controller 23. At a step 115, the controller 23 determines whether the performance drive mode has been selected. If the performance drive mode has been selected, then at a step 120, when a shift point is reached according to the performance drive mode shift schedule, the controller 23 diverts energy from the flywheel 33 to the transmission 113 to shift the gears 39. Once the shift has been accomplished, any remaining flywheel energy may be diverted to the MGU 27 to charge the battery. If the performance drive mode were not selected, then at a step 125 the control system determines if the state of charge of the battery 29 is sufficiently low. If the state of charge of the battery 29 is sufficiently low, then at step 130 the excess energy from the flywheel 33 is diverted to the MGU 27 to charge the battery 29. Once the engine 31 has reached a minimum engine speed according to applicable shift strategy or shift schedule, or the battery 29 has reached a sufficient state of charge, then at step 135 the energy from flywheel 33 is directed to the transmission 35 fill the torque hole when changing gears 39.

It will be apparent to those skilled in the art that various modifications and variations can be made to the disclosed system, vehicle, and method of operation without departing from the scope of the disclosure. Other embodiments of the system, vehicle, and method of operation will be apparent to those skilled in the art from consideration of the specification and practice of the system, vehicle, and method of operation disclosed herein. It is intended that the specification and examples be considered as exemplary only, with a true scope of the disclosure being indicated by the following claims and their equivalents.

What is claimed is:

1. A method of operating a vehicle having a hybrid powertrain, the method comprising:

selecting a first drive mode or a second drive mode for the vehicle having the hybrid powertrain from a user interface, the hybrid powertrain including:

a motor-generator unit;

a battery electrically connected to the motor-generator unit;

an engine;

a flywheel engageably connected to the engine and the motor-generator unit; and a transmission engageably connected to the flywheel and the motor-generator unit;

sending a selection of either the first drive mode or the second drive mode to a controller connected to the hybrid powertrain, determining a state of charge of the battery; and diverting stored rotational energy from the flywheel based on the state of charge of the battery and the selection of either the first drive mode or the second drive mode, wherein, when the first drive mode is selected, the controller diverts stored rotational energy from the flywheel to the transmission, and wherein, when the second drive mode is selected, the controller diverts stored rotational energy from the flywheel to the motor-generator unit to charge the battery when the state of charge of the battery is sufficiently low.

2. The method of claim 1, wherein the first drive mode is a performance drive mode, wherein the second drive mode is an economy drive mode, and wherein the controller determines the state of charge of the battery.

3. The method of claim 1, wherein the first drive mode comprises a first shift strategy and a first shift schedule for the transmission, and wherein the second drive mode comprises a second shift strategy and a second shift schedule different from the first shift strategy and first shift schedule.

4. The method of claim 1, wherein, in the first drive mode, the stored rotational energy from the flywheel is first used to change gears within the transmission.

5. The method of claim 1, wherein, in the second drive mode, energy from the flywheel is diverted to the transmission.

6. The method of claim 1, wherein the controller automatically determines where the stored rotational energy of the flywheel is directed based on the state of charge of the battery.

7. The method of claim 1, wherein the selection of either the first drive mode or the second drive mode is made at the user interface.

8. A hybrid vehicle, the hybrid vehicle comprising:

a parallel hybrid powertrain including:

a motor-generator unit;

a battery electrically connected to the motor-generator unit;

an engine;

a flywheel engageably connected to the engine and the motor-generator unit; and a transmission engageably connected to the flywheel and the motor-generator unit, a controller for controlling the parallel hybrid powertrain, and wherein, in a first drive mode, the controller is configured to divert energy from the flywheel to the transmission when changing gears of the transmission, and, wherein, in a second drive mode, the controller is configured to divert excess energy from the flywheel to the motor-generator unit to charge the battery before the controller diverts energy from the flywheel to the transmission to change gears when a state of charge of the battery is sufficiently low.

9. The hybrid vehicle of claim 8, wherein the transmission further comprises a plurality of gears and a transmission sensor, wherein the transmission sensor is configured to monitor or calculate a current selected gear of the transmission.

10. The hybrid vehicle of claim 8, wherein the hybrid vehicle further comprises a clutch that may disengage the engine from one or more shafts connected to the transmission and the motor-generator unit.

11. The hybrid vehicle of claim 8, wherein the hybrid vehicle further comprises an engine speed sensor connected to the controller.

12. The hybrid vehicle of claim 8, wherein the battery includes a state of charge sensor connected to the controller.

13. The hybrid vehicle of claim 8, further comprising one or more pedals connected to the controller.

14. The hybrid vehicle of claim 8, further comprising a user interface.

15. The hybrid vehicle of claim 14, wherein the user interface is configured to allow a use to select either a first drive mode or a second drive mode.

16. The hybrid vehicle of claim 15, wherein the first drive mode is a performance drive mode, and wherein the second drive mode is an economy drive mode.

17. A control system for a hybrid vehicle, the control system comprising:

a user interface;

one or more pedals;

a controller; and a parallel hybrid powertrain including:

a motor-generator unit;

a battery electrically connected to the motor-generator unit;

an engine;

a flywheel engageably connected to the engine and the motor-generator unit; and a transmission engageably connected to the flywheel and the motor-generator unit, wherein the controller is configured to divert energy from the flywheel based on a state of charge of the battery and a selection of either a first drive mode or a second drive mode, wherein the controller determines an order in which energy from the flywheel is diverted to either the transmission or the battery based on whether the first drive mode or the second drive mode is selected, wherein, when the first drive mode is selected, the controller diverts energy from the flywheel to the transmission, and wherein, when the second drive mode is selected, the controller diverts energy from the flywheel to the motor-generator unit to charge the battery when the state of charge of the battery is sufficiently low, before the controller diverts energy from the flywheel to the transmission.

18. The control system of claim 17, wherein, in the first drive mode, the energy from the flywheel is first used to change gears within the transmission.

19. The control system of claim 17, wherein the first drive mode is a performance drive mode, and wherein the second drive mode is an economy drive mode.

20. The control system of claim 17, wherein, the energy of the flywheel is stored rotational energy.

* * * * *